United States Patent
Lefranc

[19]

[11] Patent Number: 5,842,740
[45] Date of Patent: Dec. 1, 1998

[54] CHILD SEAT WITH MOULDED SEAT PART

[75] Inventor: Louis Lefranc, Nantes, France

[73] Assignee: Ampafrance S.A., Cholet, France

[21] Appl. No.: 660,895

[22] Filed: Jun. 7, 1996

[30] Foreign Application Priority Data

Jun. 7, 1995 [FR] France .................................. 95 06706

[51] Int. Cl.$^6$ .................................................. A47C 1/08
[52] U.S. Cl. ................................ 297/250.1; 297/256.13; 297/256.14; 297/485
[58] Field of Search ........................... 297/250.1, 256.13, 297/254, 256.15, 467, 485, 486, 487, 256.14

[56] References Cited

U.S. PATENT DOCUMENTS

| | | |
|---|---|---|
| 4,033,622 | 7/1977 | Boudreau . |
| 4,186,962 | 2/1980 | Meeker ........................... 297/256.14 X |
| 4,613,188 | 9/1986 | Tsuge et al. ........................ 297/256.13 |
| 4,685,741 | 8/1987 | Tsuge et al. ....................... 297/250.1 X |
| 4,754,999 | 7/1988 | Kain ..................... 297/256.14 |
| 5,527,094 | 6/1996 | Hiramatsu et al. ................... 297/250.1 |
| 5,567,007 | 10/1996 | Czernakowski ....................... 297/250.1 |

FOREIGN PATENT DOCUMENTS

| | | |
|---|---|---|
| A-0-353 377 | 2/1990 | European Pat. Off. . |
| A-0447 097 | 9/1991 | European Pat. Off. . |
| A-0-608 860 | 8/1994 | European Pat. Off. . |
| 2548983 | 1/1985 | France ................................ 297/250.1 |
| 41 08 660 | 9/1992 | Germany . |

*Primary Examiner*—Laurie K. Cranmer
*Attorney, Agent, or Firm*—Pennie & Edmonds LLP

[57] ABSTRACT

Child seat including a seat part and a back part and adapted to be placed on and fixed to an automobile vehicle seat provided with a three-point safety belt having a lap portion and a chest portion, characterized in that the seat part has a bottom surface adapted to be placed directly on the automobile vehicle seat and lateral surfaces defining rims of the seat part, said bottom surface including a first passage communicating with open slots in said lateral surfaces for the lap portion of the safety belt in a first position and a second passage communicating with openings for shoulder straps of a safety harness fixed to the back part of the child seat.

12 Claims, 4 Drawing Sheets

CHILD SEAT WITH MOULDED SEAT PART

The present invention concerns a child seat including a seat part and a back part designed to be placed on and fixed to an automobile vehicle seat provided with a three-point safety belt.

Child seats of this type can be fixed to the automobile vehicle seat in various ways. In some cases they are fixed by a special strap that attaches to the anchorage points of the automobile vehicle safety belts. This kind of fixing has the drawback of requiring special fixing means for the child seat.

Other prior art child seats designed to be used in an automobile vehicle are fixed to the seat of the automobile vehicle by means of the safety belt, usually of the three-point type, i.e. including a lap portion and a chest portion, fitted as standard to the vehicle seat. The child seat is usually held in position by passing the lap portion of the vehicle safety belt through openings provided in a support that is placed on the vehicle seat and to which the seat part of the child seat is fixed, possibly with an adjustment facility. The chest portion of the safety belt of the vehicle seat can be passed through the same place as the lap portion, as described for example in European patent application 447 097 (Britax). In other versions, as described for example in European patent application 353 377 (Concord), the chest portion of the vehicle safety belt is passed behind the back part of the child seat in guide means provided on said back part. The guide means may also have provision for immobilising the chest portion of the safety belt, as described for example in published German patent application No 41 08 660.

The general structure of these prior art child seats is thus somewhat complex because of the support designed to be placed on the automobile vehicle seat and receiving the seat part of the child seat. Means may be provided for inclining the child seat relative to the support attached to the vehicle seat.

Other child seats are placed directly on the seat of the automobile vehicle and a child of sufficient height is restrained by the safety belt of the vehicle, which simultaneously restrains the child seat. However, this type of arrangement is not suitable for children aged less than one to two years, usually weighing between 9 and 18 kg. It is preferable to restrain such children by means of a special harness. In this case other means must be provided for fixing the child seat to the seat of the vehicle.

The object of the present invention is a child seat designed to be mounted on an automobile vehicle seat and having a structure that is much simpler to manufacture than prior art type seats, and which is easier to place on the seat of the automobile vehicle and to attach thereto by means of the safety belt with which the latter is provided.

Another object of the invention is a seat of this type in which the child seat is fixed to the automobile vehicle seat in a particularly effective and safe way.

Another object of the invention is a child seat of this kind that can be used for young children, usually weighing between about 9 and 18 kg, the child being restrained to their seat by a safety harness with which the seat is provided and which is fixed by appropriate means to the back part and to the seat part of the child seat, the fixing of the child seat to the automobile vehicle seat being modifiable if the child weighs more than about 18 kg so that after removing the safety harness from the child seat the child can be secured to their seat entirely by the safety belt of the automobile vehicle.

The child seat of the present invention includes a seat part and a back part and is adapted to be placed on and fixed to an automobile vehicle seat provided with a three-point safety belt having a lap portion and a chest portion.

In accordance with the invention, the seat part has a bottom surface adapted to be placed directly on the automobile vehicle seat and lateral surfaces defining the rims of the seat part, said bottom surface including a first passage communicating with open slots in said lateral surfaces, for the lap portion of the safety belt in a first position, and a second passage communicating with openings for shoulder straps of a safety harness fixed to the back part of the child seat.

The first passage is preferably farther from the back part than the second passage.

The first and second passages can be on the same part of the bottom surface of the seat part or separated by a wall. This wall can delimit the openings for the shoulder straps of the harness, in which case these openings are closed off by the wall separating the two passages.

The lateral surfaces preferably have parts, which are advantageously hook-shaped parts, delimiting one side of said open slots to receive the lap portion of the safety belt in a second position.

Thus if the child weighs between about 9 and about 18 kg, so that it is appropriate to secure it to its seat by means of the safety harness with which the child seat is equipped, the lap portion of the safety belt is placed under the seat part of the child seat. To this end, the seat part is first placed directly onto the automobile vehicle seat at an appropriate location. The three-point safety belt of the vehicle is placed so that the lap portion passes over the rims of the seat part and the chest portion passes behind the back part. The belt is locked to the anchor device of the vehicle and then, from this position, the lap portion of the safety belt is slid over the lateral rims of the seat part so as to pass under the latter, the side parts rising up through the open slots before passing through the hook-shape parts.

The seat part, and therefore the child seat as a whole, is therefore held perfectly in position, fixed to the automobile vehicle seat both by the lap portion of the safety belt that passes under the seat part and by the chest portion which passes behind the back part.

In the case of an older child, and in particular a child weighing more than about 18 kg, the typical weight of a taller child, it is preferable for the child to be restrained to their seat directly by the safety belt of the vehicle. In this case the safety harness is removed from the child seat and the chest portion of the vehicle safety belt is passed in front of the child seated on the seat, instead of behind the back part of the seat. The lap portion of the safety belt is passed over the seat part, instead of under it, being held by the two hookshape parts incorporated into the lateral surfaces of the seat part.

In this way the seat and the child are perfectly restrained in the vehicle by means of the safety belt of said vehicle.

Each hook advantageously includes a bearing edge for the lap portion of the safety belt in the second position.

The back part preferably includes, on its rear face, passage means for the chest portion of the safety belt. The passage means may include means for immobilising the chest portion of the safety belt.

In one advantageous embodiment, the back part is hinged to the seat part to enable the back part to be placed in different inclinations, also allowing the back part and the seat part to be separated to reduce the bulk of the seat when not in use.

The seat part is preferably in the form of a shell moulded from synthetic material. It can also be shaped from sheet metal.

The invention will be better understood from the following detailed description of one embodiment given by way of non-limiting example and with reference to the appended drawings, in which.

Figure 1:
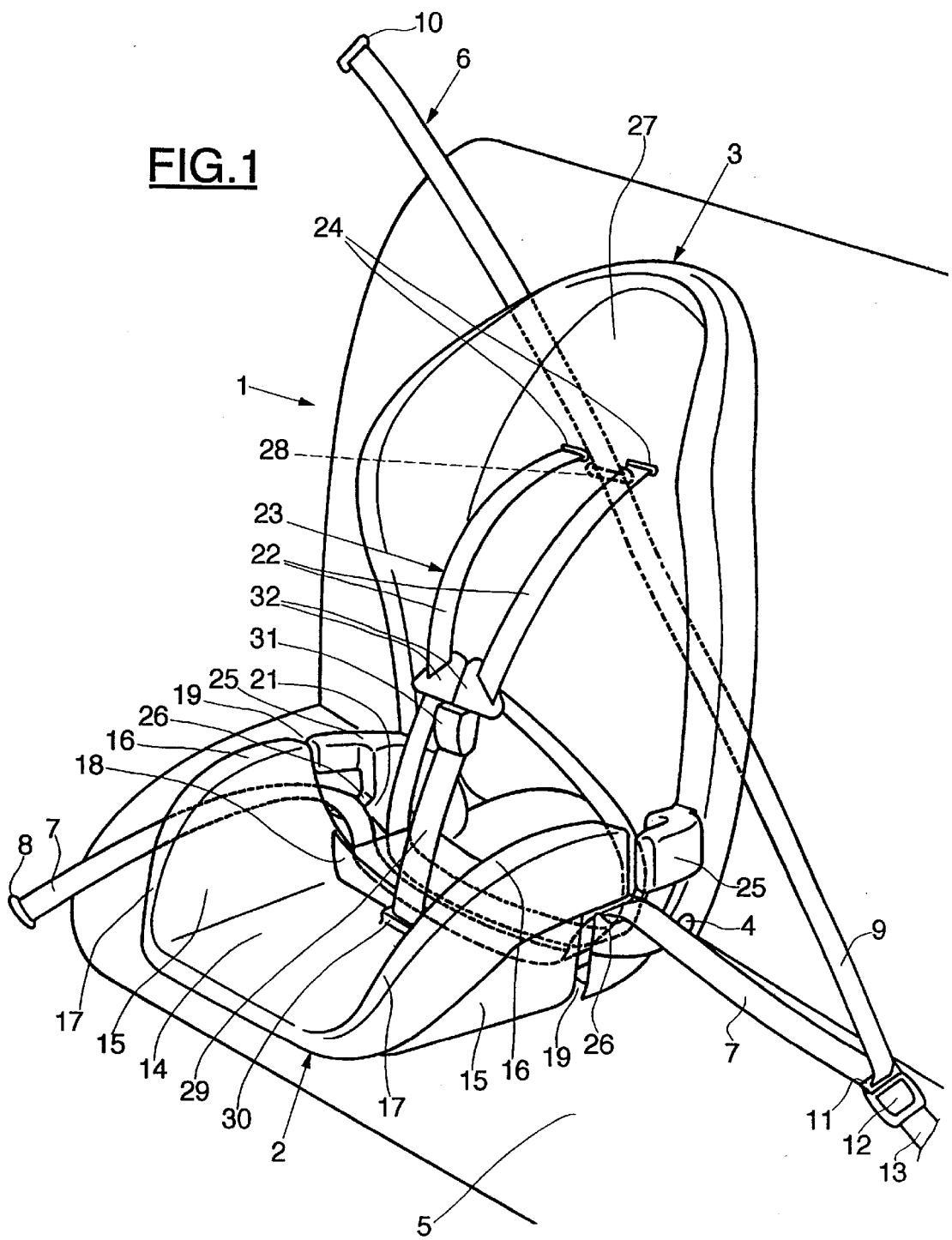
FIG. 1 is a perspective view showing a child seat of the invention installed on an automobile vehicle seat for a small child, usually weighing between 9 and 18 kg, the padding of the child seat being omitted to simplify the drawing.

As shown in the appended drawings, the child seat 1 of the invention comprises a seat part 2 and a back part 3 articulated to the seat part about a horizontal hinge pin 4. The seat 1 is placed on an automobile vehicle seat 5 provided with a three-point safety belt 6 having a lap portion 7 fixed to an anchor point 8 on the vehicle, low down on the bodyshell, and a chest portion 9 fixed to an anchor point 10 attached to a point high up on the bodyshell of the vehicle.

In the usual way, the lap portion 7 and the chest portion 9 are parts of one and the same belt which passes freely through a buckle 11 that can be inserted into a locking device 12 attached to the bodyshell of the vehicle, usually by means of a strap 13 projecting from between the seat cushion and the back cushion of the vehicle seat 5.

Figure 2:
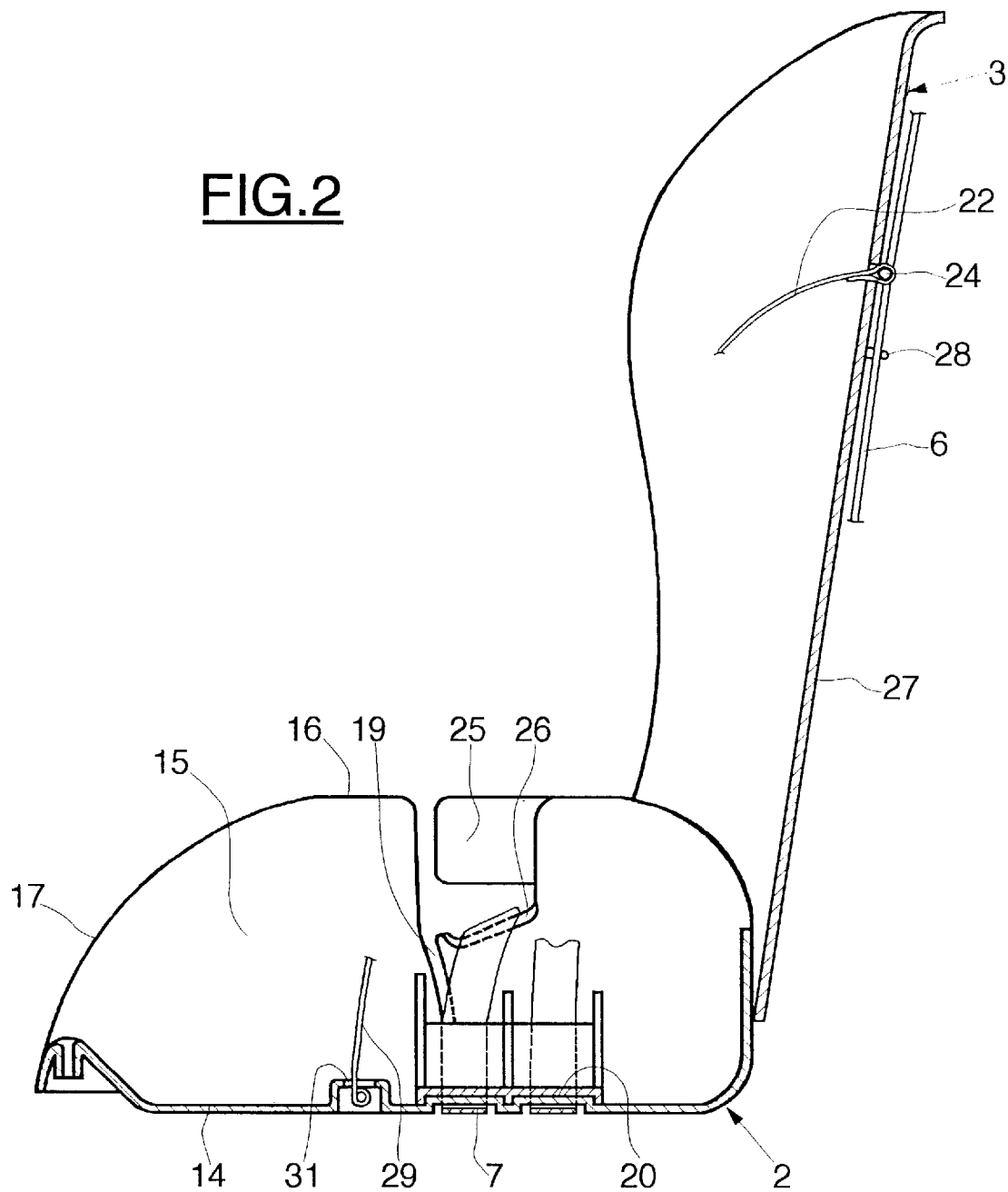
FIG. 2 is a cross-sectional view of the moulded synthetic material shell constituting the child seat of the invention.
Figure 3:
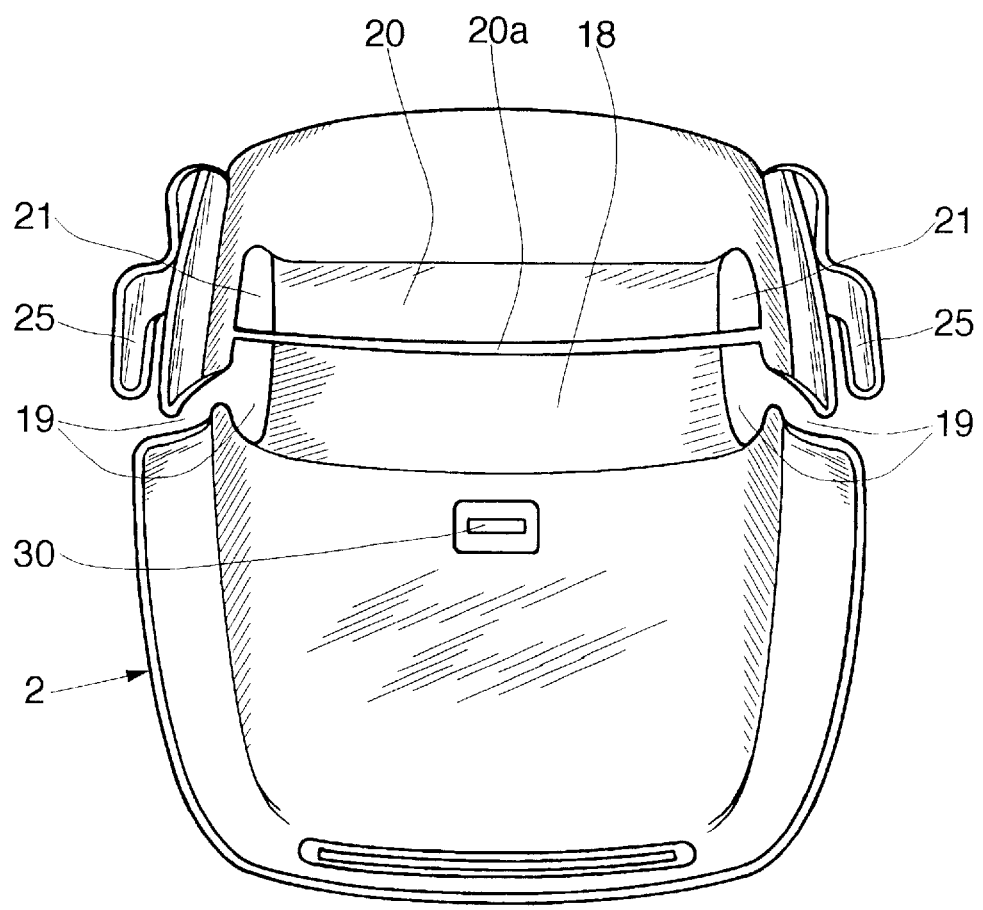
FIG. 3 is a bottom view of the seat part of the seat.

In the example shown, the seat part 2 of the seat 1 is a moulded synthetic material shell seen most clearly in the FIG. 2 sectional view and the FIG. 3 bottom view. The bottom surface 14 of the seat part 2 is adapted to be placed directly on the seat 5 of the vehicle, as can be seen in FIG. 1, without the need to provide any kind of support between the child seat 1 and the vehicle seat 5. The seat part 2 has identical and symmetrical lateral surfaces 15 which define rims 16 for the seat part. These rims are preferably rounded and have an inclined front part 17 away from the back part.

The bottom surface 14 incorporates a first trough-like passage 18 communicating with two open slots 19 in the lateral surfaces 15 extending from the rims 16 to said passage 18. The width of the passage 18 matches that of the safety belt 6 and can therefore receive the lap portion 7.

The bottom surface 14 further includes a second trough-like passage 20 communicating with openings 21. The passage 20 is adapted to receive shoulder straps 22 of a safety harness 23 (FIG. 1). The free ends of the shoulder straps 22 are fixed by the fixing means 24 to the back part 3 of the seat 1 (FIGS. 1 and 2). The passages 18 and 20 are preferably separated by a partition 20a which closes the front end of the openings 21.

The passage 18 is in front of the passage 20, i.e. farther away from the back part 3 than the latter. Alternatively, the partition 20a can be dispensed with, in which case the two passages 18 and 20 are defined by a single area of the surface 14, for example a single trough. The openings 21 are then constituted by the rear part of the open slots 19.

The lateral surfaces 15 further include hook-shape parts 25 which delimit parts of one side of the open slots 19. Each hook 25 has in its lower part a bearing rim 26 over which the lap portion 7 of the safety belt 6 can pass and on which the latter bears.

The back part 3 has on its rear face 27 passage means 28 adapted to guide the chest portion 9 of the safety belt 6. In a different embodiment the passage means 28 may further include a device for immobilising the chest portion 9 of the safety belt 6.

A crotch strap 29 is removably fixed to the seat part 2 by anchorage means 30. The crotch strap carries the locking device 31 that can also receive buckles 32 sliding along the branches of the shoulder straps 22 of the harness.

When the child has been placed on the seat, the harness 23 is fastened by fixing the buckles 32 onto the locking device 31.

The child seat of the invention can be used in different ways depending on the height of the child.

A small child, usually weighing less than 18 kg, must be secured to the seat 1 by means of the safety harness 23. The seat 1 is then placed on the vehicle seat 5 as shown in FIG. 1. The safety belt 6 of the vehicle is drawn out and the chest portion 9 is passed behind the back portion 3 and through the guide means 28. The lap portion 7 is placed on the lateral rims 16 of the seat part 2. The safety belt 6 is locked by means of the locking device 12. The child seat 1 is then fixed to the vehicle seat 5 simply by sliding the lap portion 7 forwards along the lateral rims 16 and down their inclined front portion 17, enabling the lap portion 7 to be passed under the bottom surface 14 of the seat part 2 and into the passage 18, to rise up on each side of the seat part 2 through the open slots 19 until the two lateral parts of the lap portion 7 pass over the two bearing edges 26, as shown in FIG. 1. The child seat 1 is firmly and safely secured by the safety belt 6 of the vehicle. The child can then be placed in the seat 1, which naturally includes padding that is not shown in FIG. 1. The child is secured to the seat 1 by means of the safety harness 23. The child is held securely because the safety harness 23 is attached to the seat 1, the shoulder straps 22 passing under the seat part 2 in the second passage 20 in the latter.

In the case of a taller child, and in particular a child weighing more than about 18 kg, it is preferable to remove the safety harness 23, which is a simple procedure since the fixing means 24 and the anchorage means 30 enable the harness straps to be removed.

Figure 4:
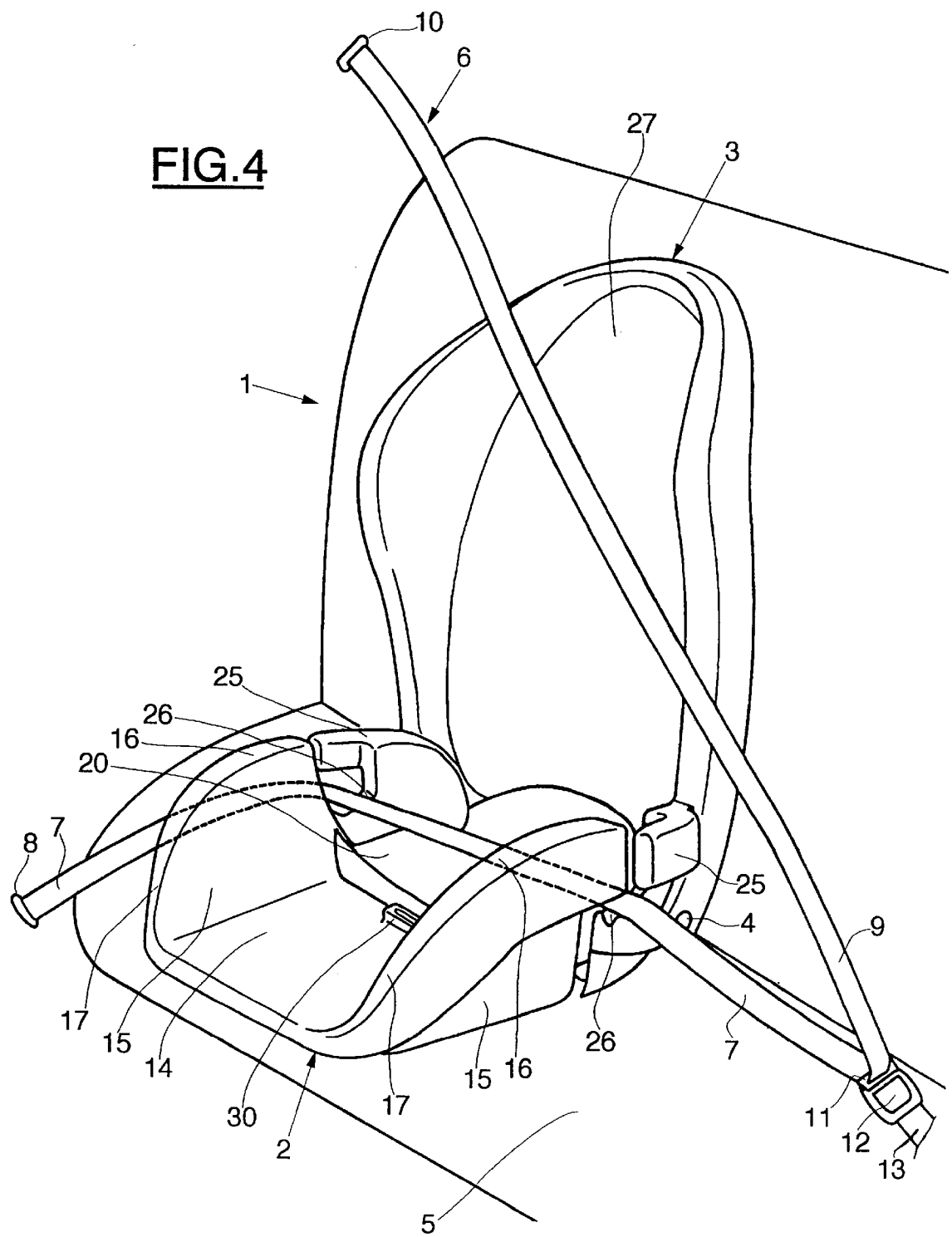
FIG. 4 is a perspective view analogous to that of FIG. 1 but showing how the seat is fitted for a taller child, usually weighing more than 18 kg.

The seat 1 is then installed on the vehicle seat 5 as shown in FIG. 4. As before, the seat 2 is placed directly on the vehicle seat 5. The child is placed in the seat. The safety belt 6 is then attached to the locking device 12, the chest portion 9 passing in front of the child and therefore also in front of the back part 3. The lap portion 7 is passed over the thighs of the child and then moved from the upper part of the rim 16 to the bearing rims 26, exiting the upper part of the open slots 19 at the level of the hooks 25.

The child is then secured to the seat 1 directly by the lap portion 7 and the chest portion 9 of the vehicle safety belt 6. In the event of an accident the child and the seat 1 are firmly secured to the vehicle seat 5 by the hooks 25.

In a preferred embodiment, as shown in the figures, the back part 3 can be inclined to the seat part 2 in various positions by means of the hinge pin 4, means not shown in the figures being used to lock the back part in the appropriate position.

The invention therefore provides a seat that is easy to install and to use and that is secured to the vehicle seat in a particularly effective way, regardless of the height of the child.

I claim:

1. A child seat adapted to be placed on and fixed to an automobile vehicle seat equipped with a three-point safety belt having a lap portion and a chest portion, comprising:

a back part equipped with a safety harness having shoulder straps, the ends of said shoulder straps being fixed to said back part; and a seat part having a bottom surface adapted to be placed directly on the automobile vehicle seat and lateral surfaces for defining rims of said seat part, said bottom surface having a first trough-like passage communicating with open slots provided in said lateral surfaces thereby letting the lap portion of the safety belt pass through when said lap portion is positioned in a first position, and a second passage communicating with openings for receiving said shoulder straps of the safety harness.

2. The child seat according to claim 1 characterized in that the first passage is farther from the back part than the second passage.

3. The child seat according to claim 1 characterized in that the first and second passages are separated by a wall.

4. The child seat according to claim 3 characterized in that the wall separating the first and-second passages delimits openings for the shoulder straps, these openings being closed at one end by the wall.

5. The child seat according to claim 1 characterized in that the lateral surfaces have parts delimiting one side of said open slots to receive the lap portion of the safety belt in a second position.

6. The child seat according to claim 5 characterized in that said parts are hook-shaped, each hook including a bearing edge for the lap portion of the safety belt in the second position.

7. The child seat according to claim 1 characterized in that the back part includes passage means on its rear face for the chest portion of the safety belt.

8. The child seat according to claim 7 characterized in that the passage means include means for immobilizing the chest portion of the safety belt.

9. The child seat according claim 1 characterized in that the back part is articulated to the seat part to enable the back part to be placed in different inclinations.

10. The child seat according to claim 1 characterized in that the seat part includes anchor means for a crotch strap of the safety harness.

11. The child seat according to claim 1 characterized in that fixing means and anchor means of the safety harness enable the safety harness to be separated from the child seat.

12. The child seat according to claim 1 characterized in that the seat part is in the form of a moulded synthetic material shell.

\* \* \* \* \*